United States Patent
Overstreet (10) Patent No.: US 7,551,225 B2
(45) Date of Patent: Jun. 23, 2009

(54) POSITIONING ACCESSORY FOR CAMERA-EQUIPPED WIRELESS TERMINALS

(75) Inventor: Frank R. Overstreet, Raleigh, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 995 days.

(21) Appl. No.: 10/731,055

(22) Filed: Dec. 9, 2003

(65) Prior Publication Data

US 2005/0122424 A1  Jun. 9, 2005

(51) Int. Cl.
*H04N 5/225* (2006.01)
*G03B 17/00* (2006.01)
*F16M 11/04* (2006.01)
*H04M 1/00* (2006.01)

(52) U.S. Cl. .............. 348/373; 348/375; 396/419; 396/428; 248/187.1; 455/575.1

(58) Field of Classification Search ............ 348/218.1, 348/207.99, 370–371, 373–376; 248/181.1, 248/187.1, 177.1, 181.2; 396/419–428; D16/239, 242, 244
See application file for complete search history.

(56) References Cited

U.S. PATENT DOCUMENTS

| | | | | |
|---|---|---|---|---|
| 916,286 | A | * | 3/1909 | Evans ................... 248/181.1 |
| 1,280,013 | A | * | 9/1918 | Goddard ............... 248/181.1 |
| 2,650,788 | A | * | 9/1953 | Hulstein .............. 248/231.71 |
| 2,670,228 | A | * | 2/1954 | Pagliuso ................. 403/137 |
| 4,081,814 | A | * | 3/1978 | Bulland ................... 396/422 |
| 5,072,907 | A | * | 12/1991 | Vogt ..................... 248/181.1 |
| 5,463,436 | A | | 10/1995 | Shintani et al. |
| 5,505,415 | A | * | 4/1996 | Brett ....................... 248/168 |
| 5,977,747 | A | | 11/1999 | Huang |
| 6,091,453 | A | | 7/2000 | Coan et al. |
| 6,177,950 | B1 | | 1/2001 | Robb |
| 6,209,830 | B1 | * | 4/2001 | Brotz ................... 248/187.1 |
| 6,229,891 | B1 | | 5/2001 | Chen |
| 6,352,228 | B1 | * | 3/2002 | Buerklin .............. 248/181.1 |
| 6,437,826 | B1 | | 8/2002 | Arnold |
| 7,128,297 | B2 | * | 10/2006 | Lee ...................... 248/187.1 |

(Continued)

FOREIGN PATENT DOCUMENTS

GB    2 372 648    8/2002

(Continued)

OTHER PUBLICATIONS

Form PCT/Separate Sheet/409 (Sheet One); International Application No. PCT/US2004/019948.

(Continued)

*Primary Examiner*—David L Ometz
*Assistant Examiner*—Richard M Bemben
(74) *Attorney, Agent, or Firm*—Coats & Bennett, P.L.L.C.

(57) ABSTRACT

A stand for a camera-equipped wireless communications device comprises a base, an adjustable terminal support movably mounted to the base, and an auxiliary system connector mounted to the base. The adjustable terminal support includes a system plug that connects to a system interface on the camera-equipped wireless communications device. The auxiliary system connector connects a peripheral device associated with the camera-equipped wireless communications device to the base. The system plug and the auxiliary system connector are interconnected by a system bus that extends through the base.

16 Claims, 8 Drawing Sheets

U.S. PATENT DOCUMENTS

| | | |
|---|---|---|
| 7,290,740 B2 * | 11/2007 | Joy et al. .................. 248/187.1 |
| 7,422,379 B2 * | 9/2008 | Agevik et al. ............... 396/424 |
| 2002/0107043 A1 * | 8/2002 | Adamson et al. ............ 455/550 |
| 2002/0186317 A1 * | 12/2002 | Kayanuma .................. 348/373 |
| 2002/0190176 A1 | 12/2002 | Louh |
| 2003/0013500 A1 | 1/2003 | Rock et al. |
| 2003/0076440 A1 | 4/2003 | Terane |
| 2003/0117104 A1 | 6/2003 | Liao |
| 2003/0125075 A1 * | 7/2003 | Klovborg .................... 455/556 |
| 2004/0004671 A1 * | 1/2004 | Takahashi ................... 348/375 |
| 2004/0110544 A1 * | 6/2004 | Oyagi et al. .............. 455/575.1 |
| 2004/0204056 A1 * | 10/2004 | Phelps, III ............... 455/556.1 |

FOREIGN PATENT DOCUMENTS

| | | | |
|---|---|---|---|
| JP | 2003319050 A | * | 11/2003 |
| JP | 2004235964 A | * | 8/2004 |

OTHER PUBLICATIONS

PCT International Search Report for International Application No. PCT/US2004/019948 filed Jun. 22, 2004; mailed Nov. 18, 2004.

* cited by examiner

POSITIONING ACCESSORY FOR CAMERA-EQUIPPED WIRELESS TERMINALS

BACKGROUND

The present invention relates generally to accessories for wireless communication devices, and more particularly to accessories for wireless communications devices having integrated cameras.

Traditional chemical film and digital cameras have the ability to connect to a tripod. The tripod allows multi-axis movement of the camera such that the camera may be tilted or turned at any desired angle. Because the tripod presents a stabilizing base for the camera, the photographer is free to engage in activities such as hands-free photography, long-exposure photography, and remote photography.

Many wireless communications devices, such as cell phones and Personal Digital Assistants (PDAs), come equipped with an integrated digital camera. Others are capable of connecting to a separate camera accessory. However, the size, fragility, and the aesthetic restrictions imposed by manufacturers on these devices, prohibit the inclusion of stabilizing structures in or on the wireless communications device. Further, conventional devices lack the ability to maneuver through one or more degrees of freedom, and thus, may only take pictures of objects or people that lie in direct sight of the lens. As a result, photography with wireless communications devices is limited. Therefore, there is a need for a compact accessory for a camera-equipped wireless communications device capable of providing multi-axis positioning control, and compatible to interface with a traditional tripod.

SUMMARY OF THE INVENTION

The present invention is a stand specially designed for a camera-equipped wireless communications device. One embodiment of the stand comprises a supporting base, an adjustable terminal support movably mounted to the base, and an auxiliary system connector mounted to the base. The adjustable terminal support supports the wireless communications device and allows positional adjustment of the device. The adjustable terminal support includes a system plug that connects to a system interface on the camera-equipped wireless communications device. The auxiliary system connector connects a peripheral device, for example, a flash unit, to the base. A system bus extends through the base to interconnect the system plug and the auxiliary system connector allowing the camera-equipped wireless communications device to be connected to the peripheral device.

DETAILED DESCRIPTION OF THE INVENTION

Referring now to the drawings, a stand according to one embodiment of the present invention is shown therein and indicated generally by the number 10. Stand 10 is specially designed for a camera-equipped mobile communications device 40, which permits a user to capture still and/or video images, as well as to communicate with a remote party via a wireless communications network. Mobile communications device 40 may be a Personal Digital Assistant (PDA), or other wireless communications device equipped with camera functionality. Device 40 comprises a display 42, a camera lens 44, a keypad 46, a system interface 48, and a transceiver and an antenna (not shown) to facilitate wireless communications with a remote party. Display 42 acts as a viewfinder, and permits users to view images captured through camera lens 44. Keypad 46 allows the user to control the functionality of device 40, including camera functionality, and system interface 48 facilitates a connection with any number of desired accessories.

Figure 1:
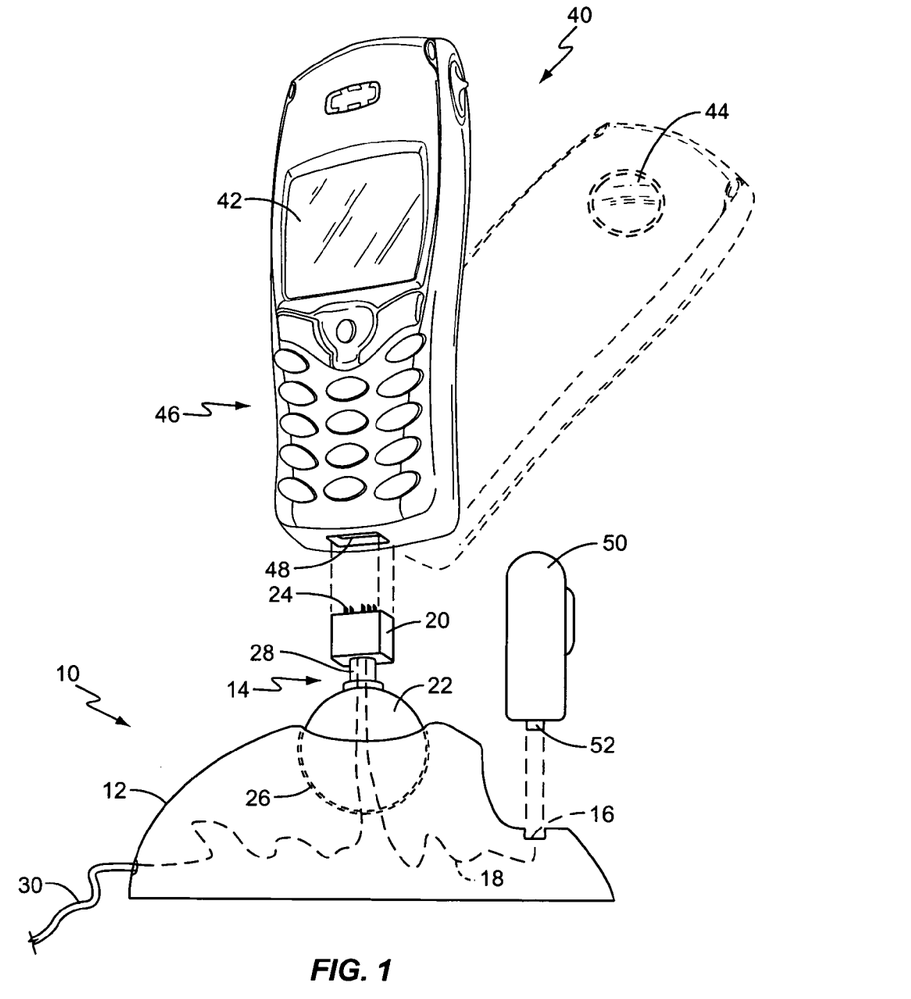
FIG. 1 illustrates one embodiment of the present invention.

As seen in FIG. 1, stand 10 comprises a base 12 with an auxiliary system connector 16, an adjustable terminal support 14 with a system plug 20, and a system bus 18 that electrically connects the auxiliary system connector 16 to the system plug 20. Base 12 has a relatively wide and flat-bottom surface that, when placed on a support surface, stabilizes device 40. The top of base 12 includes a socket 26 to receive the adjustable terminal support 14. The front portion of base 12 includes an auxiliary system connector 16 for connecting peripheral devices, as will be described in more detail later.

Adjustable terminal support 14 includes a ball-member 22 that is received in the socket 26 in base 12. The ball-member 22 pivots about a vertical axis as well as provides front-to-back and side-to-side rotational movement for device 40. A shaft 28 connects a system plug 20 to ball-member 22. In one embodiment, shaft 28 is a telescoping shaft that allows the user to raise and lower device 40. System plug 20 connects to system interface 48 on device 40, and includes one or more contacts 24 that mate with one or more corresponding contacts in system interface 48 when device 40 is connected to system plug 20.

It should be understood that adjustable terminal support 14 might comprise mechanisms other than the ball-and-socket type mechanism shown in the figures. For example, in one embodiment, adjustable terminal support 14 may comprise a flexible tube or gooseneck type shaft fixedly mounted to base 12. In another embodiment, adjustable terminal support 14 comprises an articulating arm. As those skilled in the art will realize, other mechanisms may be equally as suitable, so long as they provide multi-axis control to device 40 and allow movement to any desired angle.

System bus 18 passes through the interior of adjustable terminal support 14 and base 12 and interconnects system plug 20 and auxiliary system connector 16. Routing system bus 18 in this manner reduces the possibility of entanglement, connects wires, and facilitates an aesthetically pleasing appearance. System bus 18 comprises one or more wires or cables that provide an electrical pathway for communicating electrical signals between system plug 20 and auxiliary system connector 16, such as data, synchronization signals, and power. In one embodiment, system bus 18 comprises a ribbon cable that forms a straight-through connection between the contacts 24 of the system plug 20 and auxiliary system connector 16. While not required, the configuration of auxiliary system connector 16 may be the same as the configuration of system interface 48 on device 40. This allows device 40 to communicate with a peripheral device connected to auxiliary system connector 16 as if the peripheral device were plugged directly into the system interface 48. That is, whatever signals are normally communicated between device 40 and an associated peripheral device when they are directly connected may be communicated over system bus 18.

As previously mentioned, auxiliary system connector 16 allows peripheral devices to be connected to device 40 via system bus 18. The figures illustrate the peripheral device as being a flash accessory 50, however, any accessory capable of connecting to system interface 48 may connect to auxiliary system connector 16. For example, flash accessory (50) may comprise a separate camera and flash accessory used by devices that do not include integrated cameras. Auxiliary system connector 16 comprises one or more contacts that correspond to one or more pins on interface 52 of flash accessory 50. Conventionally, interface 52 of flash accessory 50 connects to system interface 48 of device 40 so that signals may be communicated between the two. In this embodiment, those signals are passed over system bus 18. Thus, when the user snaps a picture, for example, device 40 may transmit a signal over system bus 18 to activate a flash accessory 50.

Figure 1A:
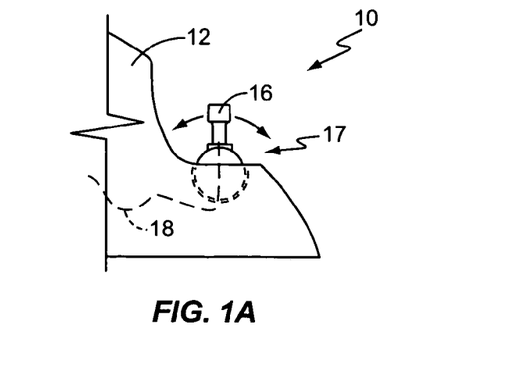
FIG. 1A illustrates an alternate embodiment of the present invention.

Alternatively, as seen in FIG. 1A, auxiliary system connector 16 may comprise a structure similar to that of adjustable terminal support 14. In particular, auxiliary system connecter 16 may be disposed on one end of adjustable support 17. Thus, auxiliary system connector 16 may pivot about a vertical axis as well as provide front-to-back and side-to-side rotational movement for flash accessory 50.

In a preferred embodiment, stand 10 also includes a power cord 30 that connects stand 10 to an external power source (not shown), such as an external AC/DC converter. Alternatively, the AC/DC converter may be integrated into base 12. Thus, stand 10 might comprise, for example, a charging unit that charges the batteries of device 40 and/or flash accessory 50, and provides power. Like the system bus 18, power cord 30 is contained mostly within the interior of adjustable terminal support 14 and base 12 for aesthetic reasons and to prevent entanglement.

Figure 2:
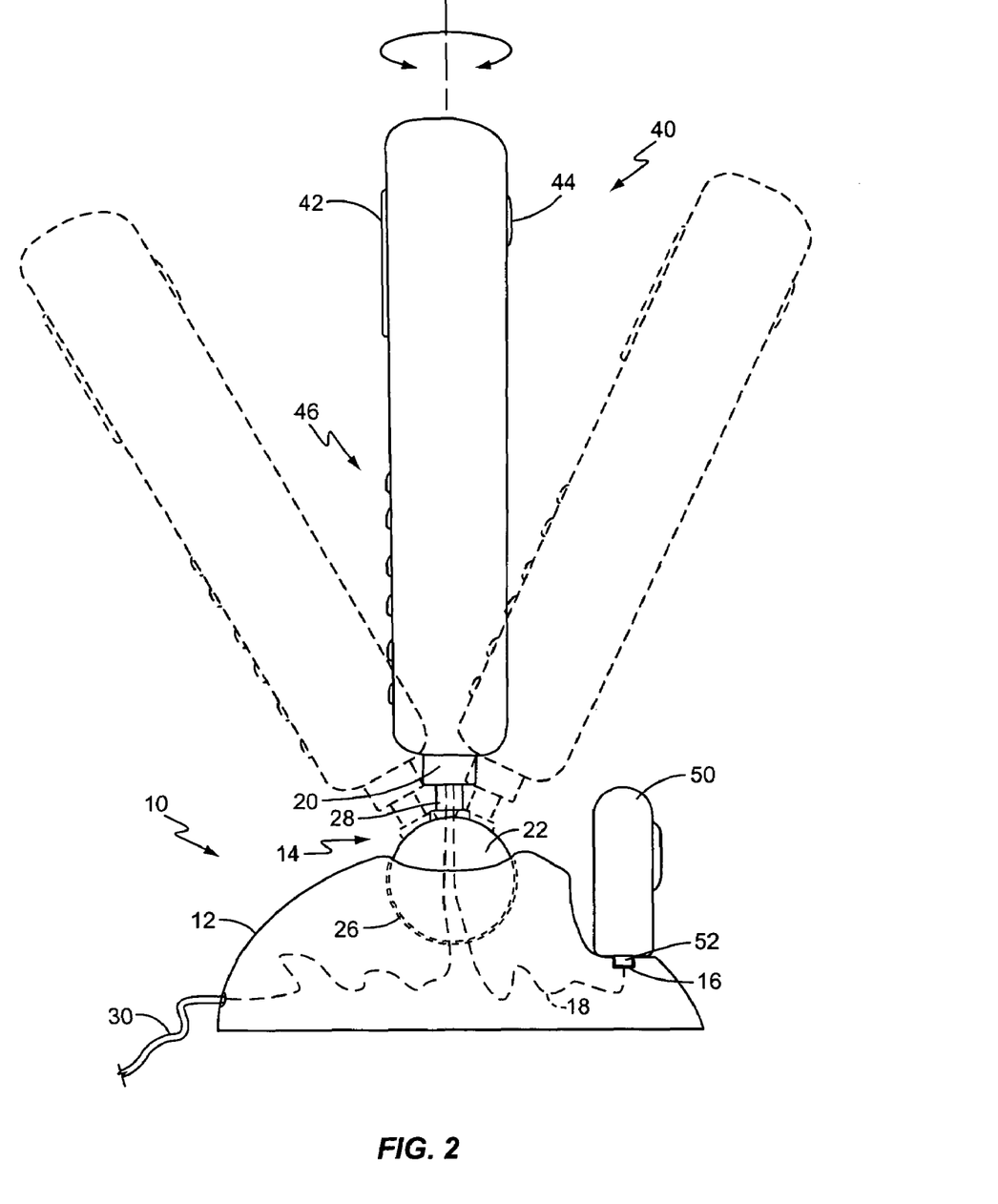
FIG. 2 is a side view that illustrates multi-axis control according to one embodiment of the present invention.
Figure 3:
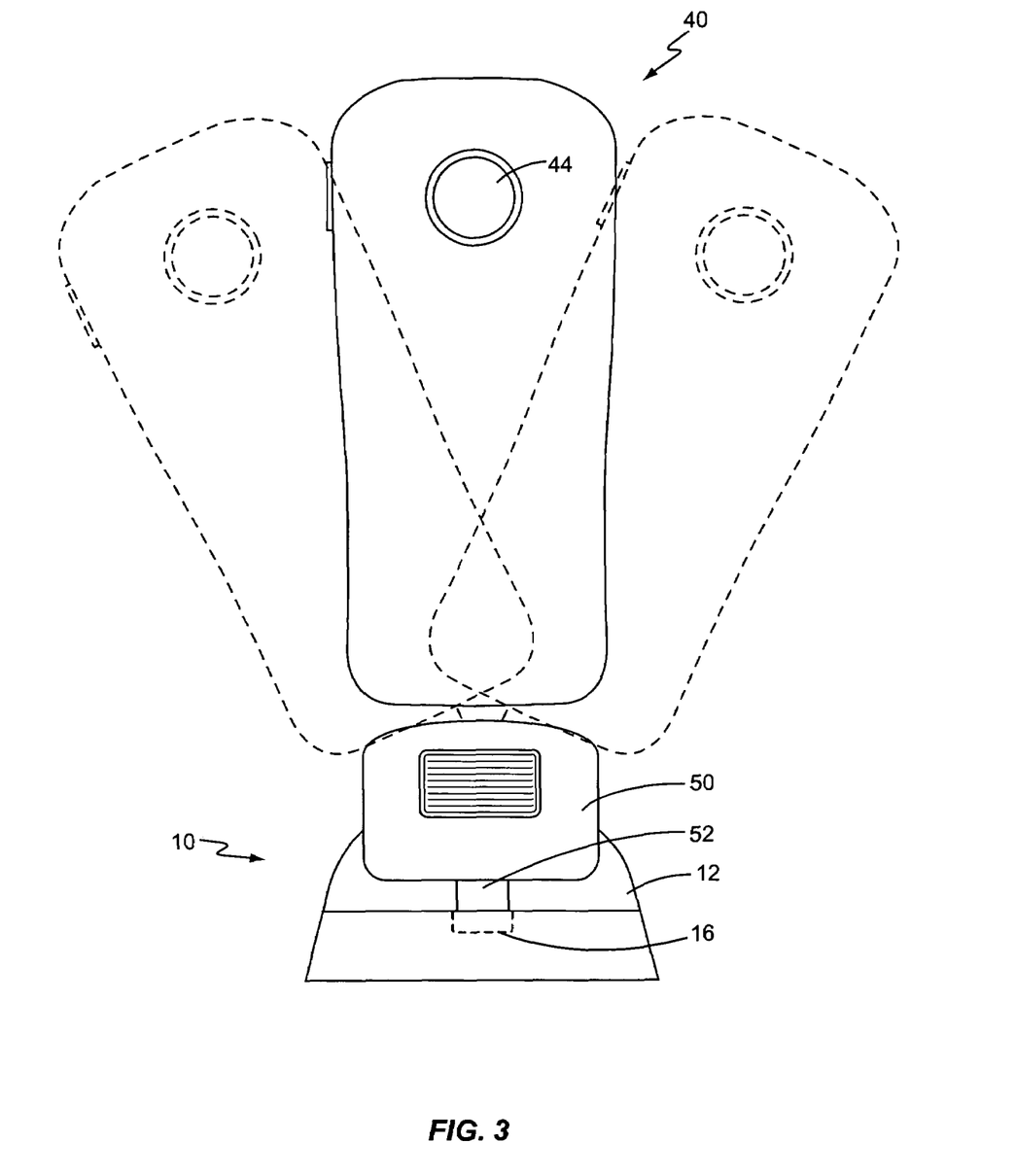
FIG. 3 is a front view that illustrates multi-axis control according to one embodiment of the present invention.

In use, the user may place stand 10 on a table or other suitable surface in order to capture still and/or video images. In particular, the user simply connects the system interface 48 of device 40 to system plug 20. The user may also connect interface 52 of flash accessory 50 to auxiliary system connector 16 if additional light is needed. The user then adjusts device 40 to a desired position by extending the telescoping shaft and/or moving adjustable terminal support 14 to the desired position. Some of these possible movements are shown in FIGS. 2 and 3. For example, the user may pivot device 40 about a vertical axis, as well as front-to-back and side-to-side. Moreover, the user may move device 40 to any position permitted by adjustable support 14. Once positioned, the user activates the camera via the keypad or a separate remote control (not shown). Device 40 then activates flash accessory 50 by sending a signal via system bus 18, and operates lens 44 to capture the image.

Figure 4:
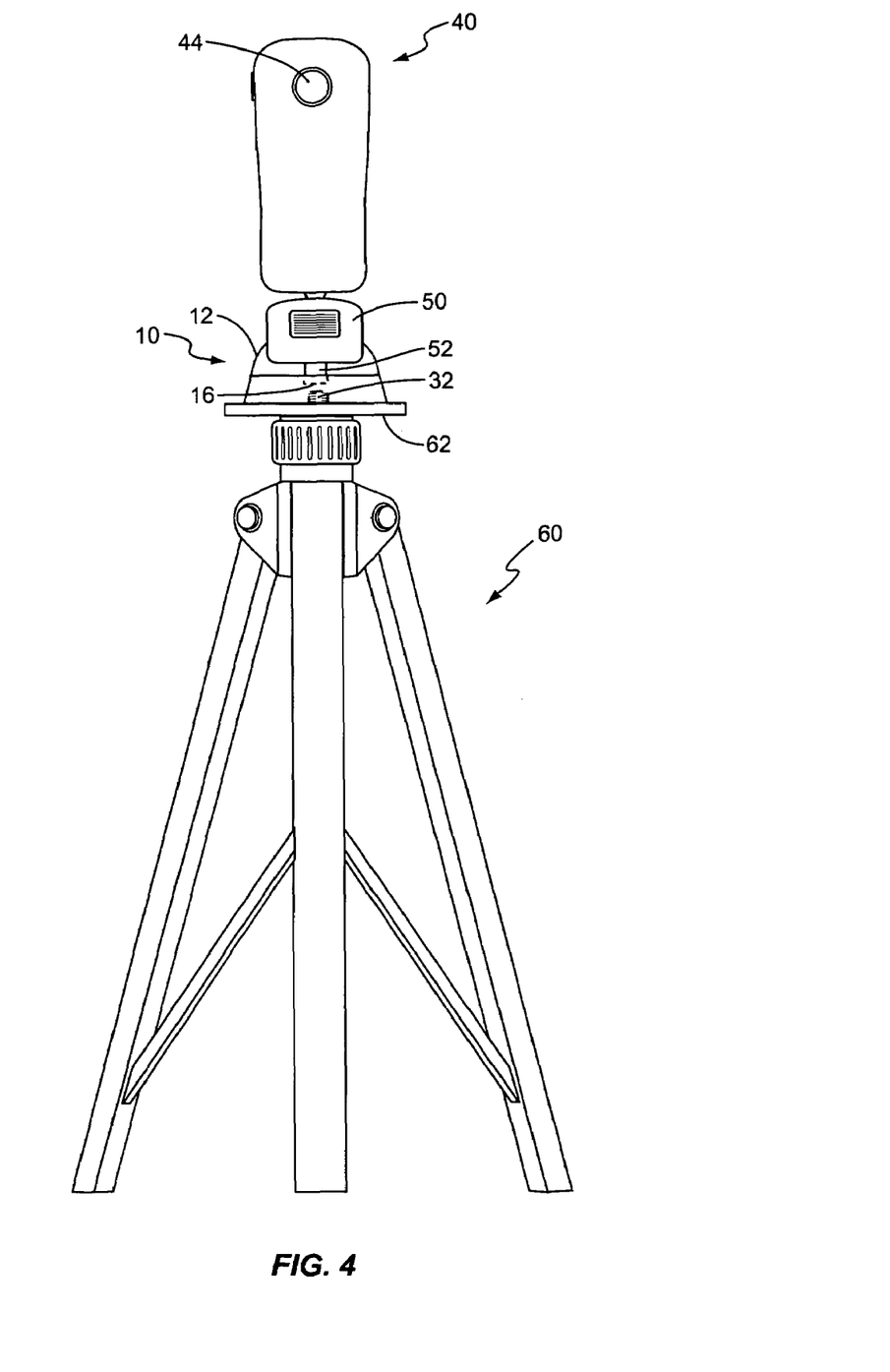
FIG. 4 is a front view that illustrates one embodiment of the present invention mounted on a tripod.

FIG. 4 illustrates an alternate embodiment of the present invention for settings that are absent a table or desk or other stable support surface for base 12. Specifically, stand 10 may be mounted to a tripod 60 that includes a platform 62 having a flat surface and a mechanical fastener, for example, a threaded bolt. The threads on the bolt correspond to the threads machined into a threaded receptacle 32 disposed in the bottom of base 12. To secure stand 10 to tripod 60, the user simply aligns receptacle 32 with the bolt and screws base 12 to platform 62. Once mounted to the tripod 60, the user may connect device 40 and flash accessory 50 and position them as previously described. Thus, stand 10 may be used in both indoor and outdoor situations.

Figure 5A:
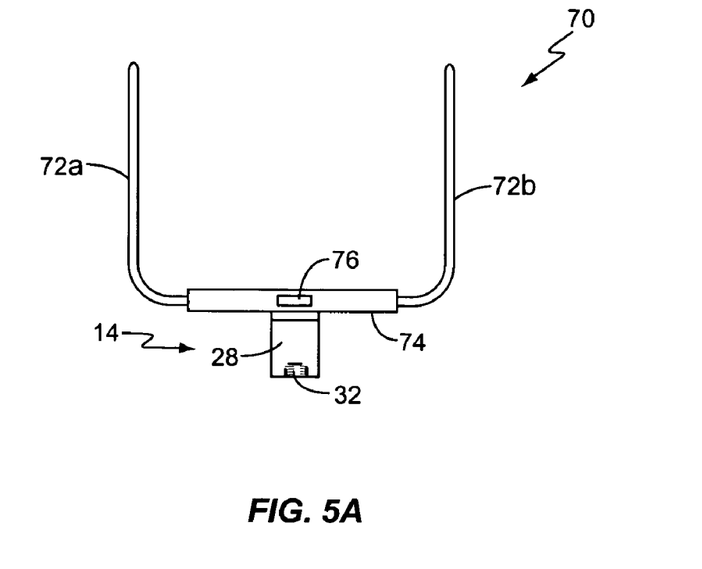
FIGS. 5A-5B illustrate another embodiment of the present invention.
Figure 5B:
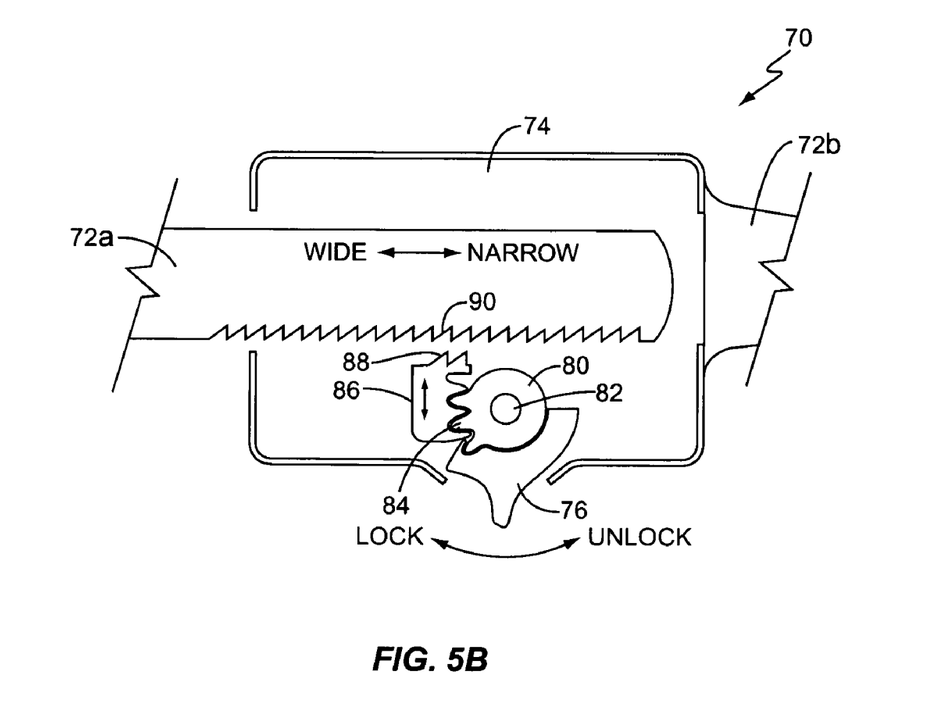

FIGS. 5A and 5B illustrate an alternate embodiment of the present invention wherein adjustable terminal support 14 includes a universal cradle 70 that clamps device 40 regardless of the shape, size, or manufacturer of device 40. Cradle 70 comprises a pair of arms 72a, 72b, a housing 74, a locking lever 76 connected to a movable gear 80, and a retractable pawl 86 slidably connected to housing 74. Threaded receptacle 32 is disposed in the bottom of post 78 to mate cradle 70 to tripod 60.

At least one of the pair of arms 72 is adjustable into and out of housing 74, and includes a plurality of teeth 90 that are engaged by locking teeth 88 on retractable pawl 86. In the embodiment of FIGS. 5A-5B, arm 72a is adjustable, while arm 72b is connected to housing 74. However, those skilled in the art will appreciate that both arms 72a, 72b may be adjustable. The arms 72 are typically rigid, but may also be constructed of a semi-flexible material to clamp the housing of device 40. In one embodiment, arms 72 are rigid, but covered in a rubberized material. The rubberized material protects the housing of device 40 from being scratched, and may be compressible to facilitate a positive grip on device 40.

Locking lever 76 connects to gear 80 via axle 82, which in turn, is rotatably connected to housing 74. One or more gear teeth 84 on gear 80 mesh with one or more corresponding gear teeth on retractable pawl 86. Moving locking lever 76 from the locked to the unlocked position (or vise versa) rotates gear 80 and slides retractable pawl 86 back and forth. As retractable pawl 86 slides back and forth, locking teeth 88 engage/disengage corresponding teeth 90 on arm 72a to lock/unlock arm 72a. Thus, a user may clamp device 40, regardless of its size or shape, simply by placing device 40 between arms 72a and 72b, and moving locking lever 76 to the locked position.

Figure 6:
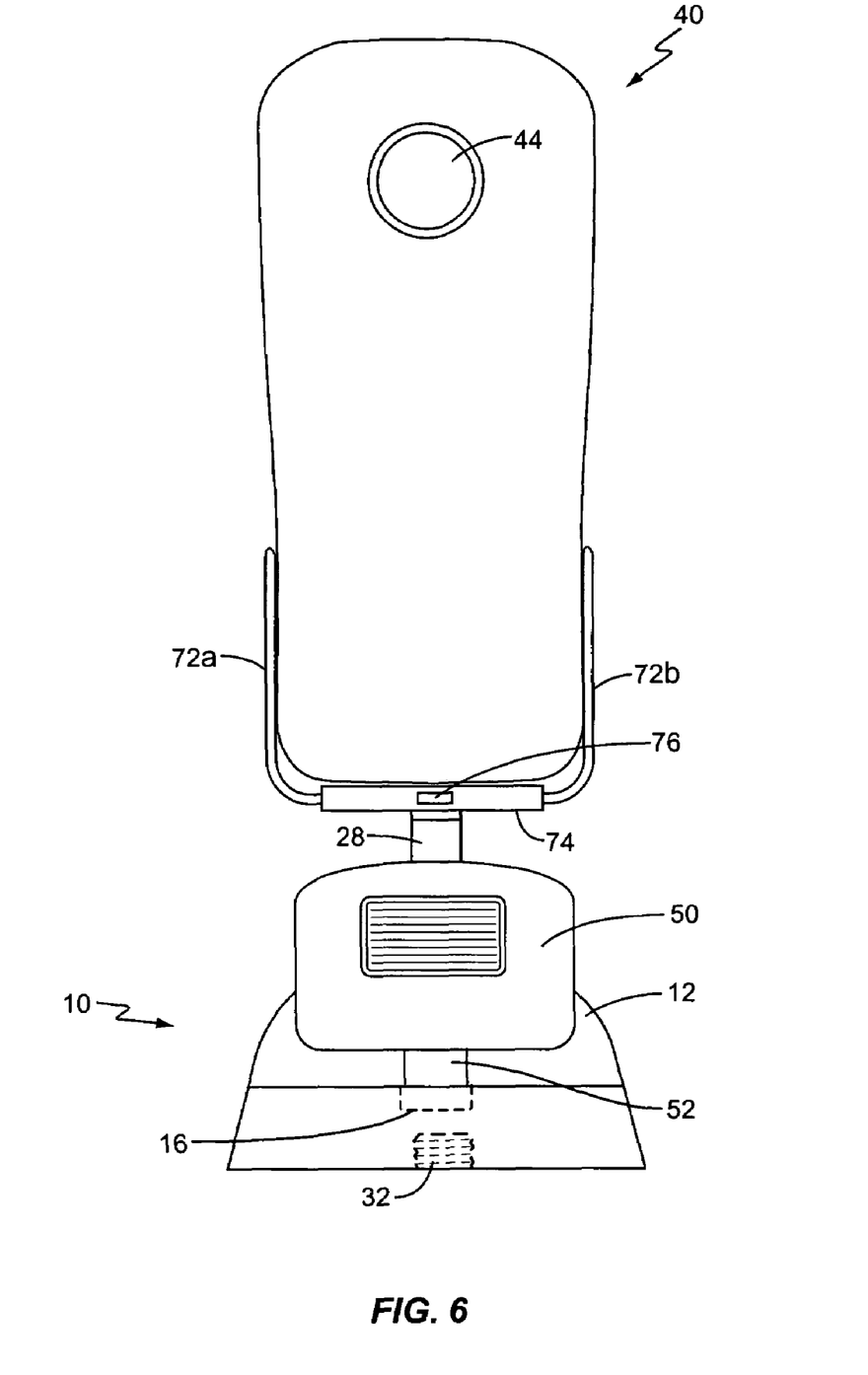
FIG. 6 illustrates an alternate embodiment of the present invention illustrated in FIGS. 5A-5B.

It should be understood that while the embodiment of FIG. 5A is designed to mate with tripod 60, it is not so limited. For example, FIG. 6 illustrates an alternate embodiment much like the embodiment of FIG. 1. As in FIG. 1, system plug 16 connects to system interface 48, and flash accessory 50 connects to auxiliary system connector 16. Thus, whether mated to base 12 or tripod 60, cradle 70 may be moved in one or more degrees of freedom.

Figure 7:
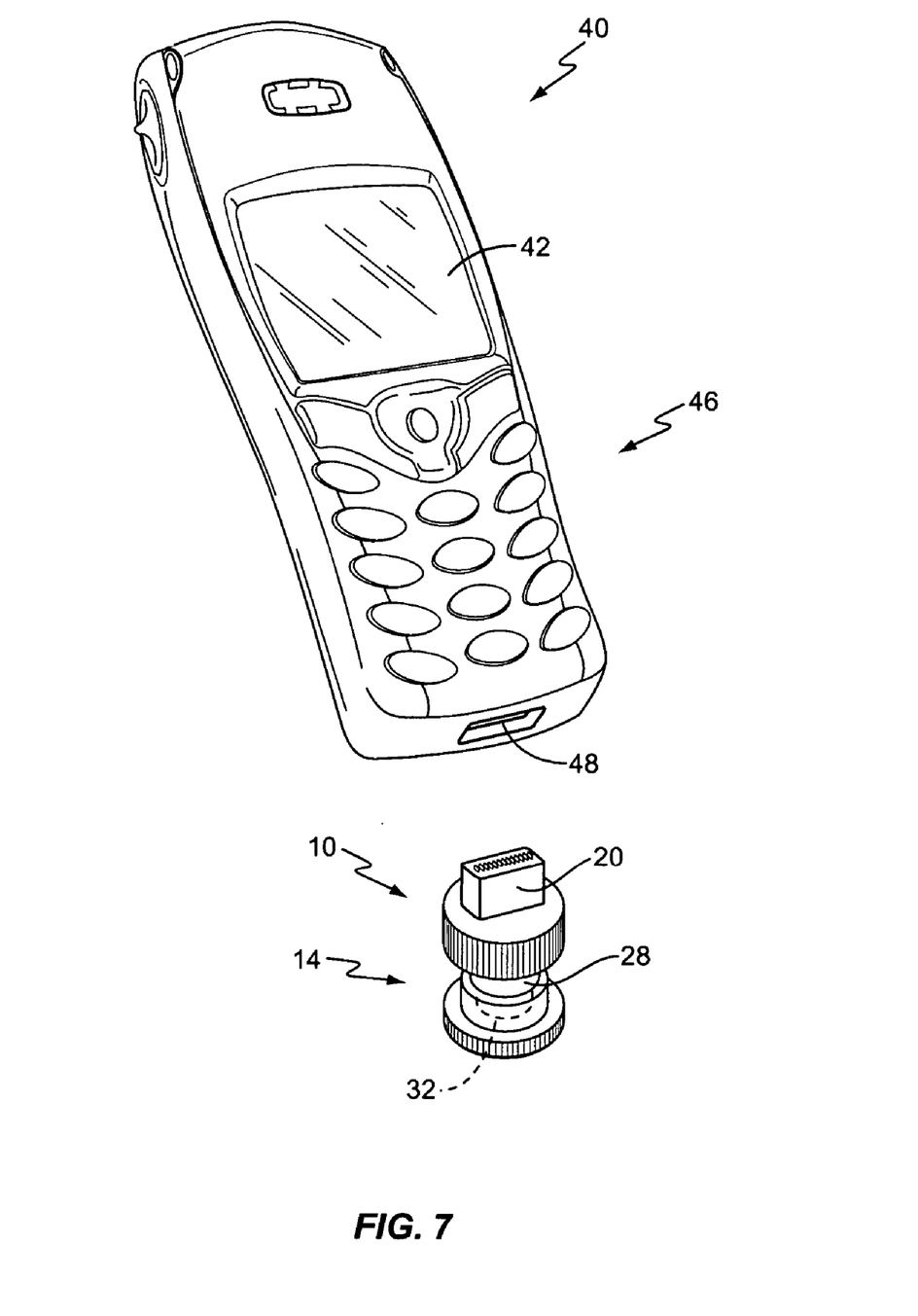
FIG. 7 illustrates another alternate embodiment of the present invention.
Figure 8:
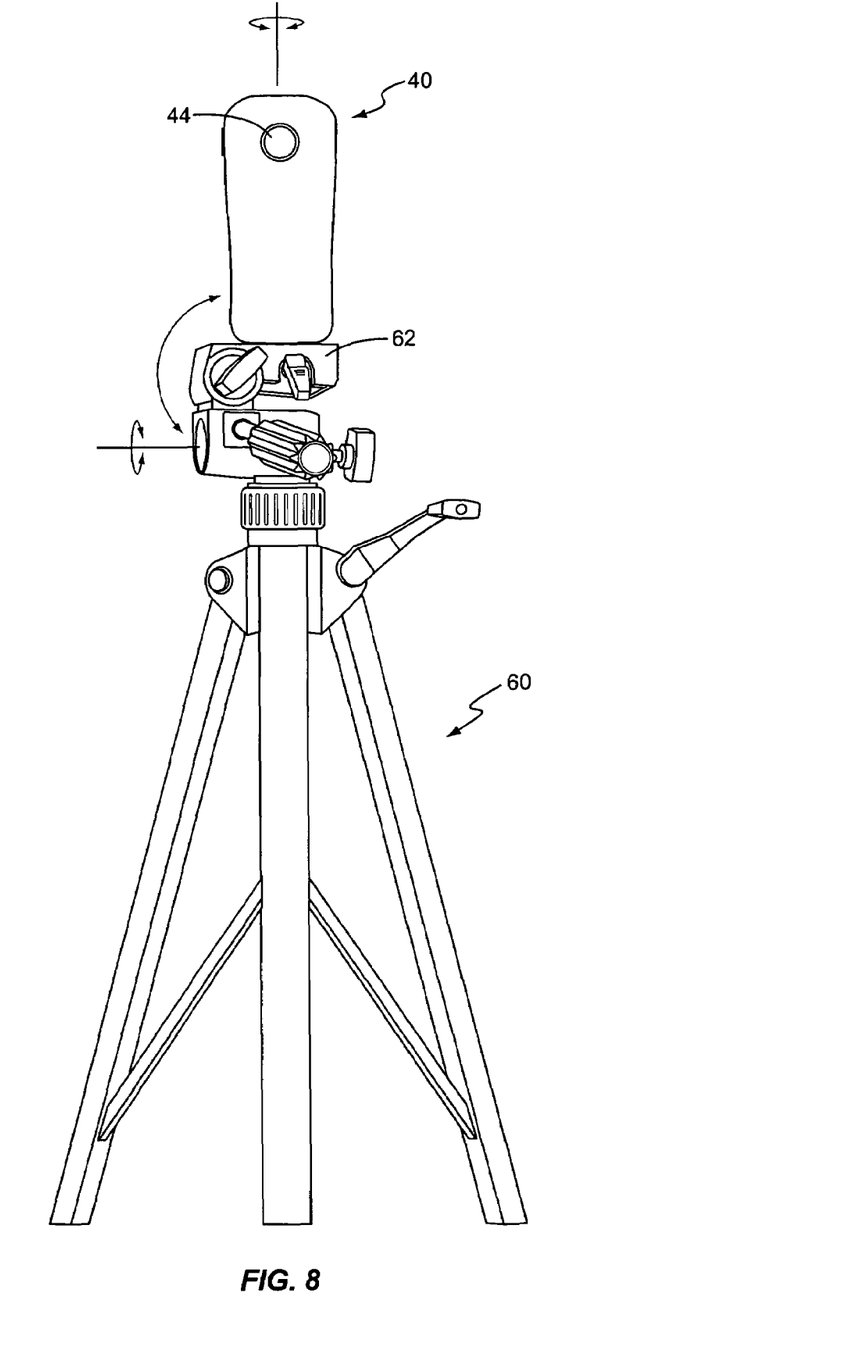
FIG. 8 illustrates the embodiment of FIG. 6 mounted on a tripod.

In another alternate embodiment shown in FIGS. 7 and 8, stand 10 comprises only the adjustable support terminal 14, system plug 16, and threaded receptacle 32. This embodiment is a compact embodiment that allows a user who may already own tripod 60 to take full advantage of any positioning functionality already present on tripod 60. In this embodiment, the user connects system plug 16 to system interface 48, and mounts stand 10 to tripod 60 by mating the threaded receptacle 32 with the existing mechanical fastener attached to platform 62. Once connected, the user adjusts the positional controls of tripod 60 to position the height and angle of device 40.

Alternatively, stand 10 may be configured to mate with tripods that do not have threaded mechanical fasteners included with them. For example, the embodiment of FIG. 6 may fit in a recess (not shown) in platform 62, and clamped securely to the platform 62. Those skilled in the art will appreciate that various tripods have various mechanisms by which to secure a camera or video device, and stand 10 may be constructed to mate with any of those mechanisms.

The present invention may, of course, be carried out in other ways than those specifically set forth herein without departing from the essential characteristics of the invention. Accordingly, the present embodiments are to be considered in all respects as illustrative and not restrictive, and all changes coming within the meaning and equivalency range of the amended claims are intended to be embraced therein.

The invention claimed is:

1. A stand for a camera-equipped wireless communications device comprising:
   a base to support the camera-equipped wireless communications device;
   an adjustable terminal support movably mounted to the base, and including a system plug that connects to a system interface on the camera-equipped wireless communications device;
   an auxiliary system connector mounted to the base to connect a peripheral device associated with the camera-equipped wireless communications device to the base, wherein the auxiliary system connector comprises a shaft that connects the auxiliary system connector to a ball member movably retained by the base; and
   a system bus extending through the interior of the base that interconnects the system plug and the auxiliary system connector.

2. The stand of claim 1 further comprising a power bus to provide power to the system plug.

3. The stand of claim 2 wherein the power bus further provides power to the auxiliary system connector.

4. The stand of claim 1 further comprising a threaded mounting point disposed on the underside of the base to mount the base to a tripod.

5. The stand of claim 1 wherein the adjustable terminal support comprises a shaft.

6. The stand of claim 5 wherein the shaft comprises a telescoping shaft.

7. The stand of claim 1 wherein the adjustable terminal support provides one or more degrees of freedom to the camera-equipped wireless communications device.

8. The stand of claim 7 wherein the adjustable terminal support includes a ball member at one end that is movably retained by the base.

9. The stand of claim 1 wherein the shaft that connects the auxiliary system connector to a ball member movably retained by the base comprises a telescoping shaft.

10. The stand of claim 1 wherein the auxiliary system connector provides the peripheral device with one or more degrees of freedom.

11. The stand of claim 1 wherein the peripheral device associated with the camera-equipped wireless communications device is a flash accessory.

12. The accessory of claim 1 wherein the peripheral device associated with the camera-equipped wireless communications device is a camera.

13. The stand of claim 1 wherein the system bus electrically connects the system plug to the auxiliary system connector.

14. The stand of claim 1 wherein the base is a charger for the camera-equipped wireless communications device.

15. The stand of claim 1 wherein the camera-equipped wireless communications device includes an integrated camera.

16. The stand of claim 1 wherein the camera-equipped wireless device connects to a separate camera accessory via the system bus.

* * * * *